United States Patent

Shirmohamadi

[11] Patent Number: 6,057,508
[45] Date of Patent: May 2, 2000

[54] SAG COMPENSATOR FOR SUSPENDED LINES

[76] Inventor: Manuchehr Shirmohamadi, 18637 W. Cavendish Dr., Castro Valley, Calif. 94552

[21] Appl. No.: 09/130,815

[22] Filed: Aug. 7, 1998

Related U.S. Application Data

[63] Continuation-in-part of application No. 08/763,229, Dec. 10, 1996, Pat. No. 5,792,983.
[51] Int. Cl.[7] .............................. E04H 12/24; H02G 1/02; H02G 7/02
[52] U.S. Cl. ................................ 174/45 TD; 174/40 TD; 174/43; 174/45 R
[58] Field of Search .................... 174/45 TD, 40 TD, 174/40 U, 43, 45 R, 138 R, 137 R

[56] References Cited

U.S. PATENT DOCUMENTS

| | | | |
|---|---|---|---|
| 3,044,763 | 7/1962 | Jorzenink | 174/45 TD |
| 3,729,172 | 4/1973 | Casalta et al. | 174/5 R |
| 3,993,197 | 11/1976 | Tann | 211/119.09 |
| 4,616,103 | 10/1986 | Balteau | 174/40 TD |
| 4,695,677 | 9/1987 | Ruth et al. | 174/40 TD |

*Primary Examiner*—Kristine Kincaid
*Assistant Examiner*—Mark Olds

[57] ABSTRACT

The invention uses one or more scissor devices, or disks, or cogs such that the axial thermal expansion of a coupling member is amplified such that this amplified movement is used to automatically mitigate the sag of a suspended line; the same ambient temperature change that causes the line to sag concomitantly causes the coupling member to expand, so that sag mitigation is passive and automatic. The invention includes a device for automatically mitigating thermal expansion sag in suspended lines comprising a coupling member or actuator rod (140) that expands axially with increasing temperature and that is mounted between the proximal arms (110) of a reverse-scissor component (60), said reverse-scissor component having first arms (70) and second arms (80) and a hinge (90) and the arms having distal ends (100) longer than proximal ends (110). The distal arms are insulated by insulators (130). The reverse hinge acts such that when the proximal arms are moved apart, the distal arms are brought together. The distal arms of the reverse-scissor component are attached to a power line (120) such that when the distal arms are brought together, the slack in the power line is taken up automatically as ambient temperature increases.

17 Claims, 10 Drawing Sheets

SAG COMPENSATOR FOR SUSPENDED LINES

RELATION TO OTHER APPLICATIONS

This application is a continuation-in-part of application Ser. No. 8/763,229, which was filed on Dec. 10, 1996, to be issued on Aug. 11, 1998 as U.S. Pat. No. 5,792,983, entitled "SAG COMPENSATOR FOR SUSPENDED LINES USING ROTARY MOTION".

FIELD OF INVENTION

This invention relates to insulating devices for holding electrical transmission lines to towers and the like, and more specifically to such devices that can automatically compensate for changes in transmission line sag.

DESCRIPTION OF THE PRIOR ART

Transmission power lines are electrical lines that typically carry high voltage, e.g., 230 KV. For reasons of safety, such lines are suspended well above ground level, typically from towers or the like. FIG. 1 shows towers 10 and 20 that suspend a power line 30. (Although in practice the towers will have extension arms and will carry several lines, for ease of illustration, FIG. 1 has been simplified.) Power line 30 is suspended from towers with insulating devices 40, for example ceramic or glass and rubber and fiberglass insulators whose length can range from a few inches, such as six inches, to over fifteen feet, such as twenty feet, depending on the voltage in the line and the environment.

Power lines, which are generally supported by transmission towers, cover large distances. Due to the force of gravity, power lines intrinsically tend to sag. This initial sag increases with line temperature because the conducting material of which the line is made expands as line temperature increases, effectively lengthening the line. A small increase in line length produces a large, and potentially hazardous increase in sag. For example, for a line with a 300 foot tower spacing and an all aluminum conductor, a temperature increase of 30° F., for instance the temperature change between winter and summer months, which causes a 1.4 inch increase in line length, will increase the sag by about 2.2 feet.

Increase in line temperature may be due to a number of factors including increased ambient air temperature, decreased wind flow over the line and increased current flow through the line. Sagging power lines create fire hazards and other public safety issues due to ground clearance.

Such sag is indicated in FIG. 1 by the phantom-line version of power line 30, 30' which represents the power line's position at a temperature of $T_1$, such that temperature $T_1$ is greater than temperature $T_0$. The distance from the sagging line to the ground is represented by y. The extent of the sag is indicated by the distance Dy between the power line 30 and the phantom power line 30'. H is the height of the towers and Dx is the span length. Such sag can reduce the clearance between ground and the transmissions lines. The problem of sagging power lines is well known to the electric power industry and is associated with problems which are hazardous and which are both time consuming and expensive to rectify. Sagging power lines pose an electrocution hazard to persons and vehicles and can lead to interruption in power supply and are known to cause hugely destructive and expensive forest and brush fires.

It is not known in the prior art how to truly effectively cope with thermal line sag. Present techniques to compensate for such sag include (i) Shortening the distance between adjacent towers to reduce span length and thus reduce line sag; this is shown in FIG. 1A wherein Dx' is shorter than Dx and wherein Dy' is shorter than Dy. (ii) Erecting taller transmission towers to accommodate line sag; this is shown in FIG. 1B in which H' is greater than H and y" is greater than y. (iii) Retro-fitting existing towers to increase height and (iv) Limiting electrical current load capacity to compensate for increased ambient temperature. Other methods for reducing sag and for keeping a suspended line taught include the use of constant tension elements such as springs and pre-stressed tensioners and even the use of strategically placed weights on the suspended line, but none of these other methods automatically compensates for thermally induced line sag by exploiting the concomitant thermal expansion of a coupling member or actuating rod.

Seasonal changes in ambient air temperature are the most significant contributor to line sag. To compensate for increased ambient air temperature during warm summer months, electric utilities must often reduce current conducted by the power lines at the very time when demand may be highest, e.g., to power air conditioners. Such current limitation may be in the 30% range during summer months, which results in economic losses to the power utility due to inability to meet demand. Needless to say, erecting higher and/or more closely spaced towers represents a further economic cost to the power utility.

There is a need for a device that can be used to retain transmission power lines to towers or the like, which device can automatically compensate for changes in ambient temperature to reduce thermal sag in the associated power lines. Preferably such devices should be inexpensive to fabricate, inexpensive to install, and substantially maintenance free.

The present invention discloses such a device, and a method for reducing sag caused by temperature increase in suspended electrical transmission wires.

FIG. 2 shows a representation of the sag mitigation invention 50 installed on transmission towers 10 and 20 from which the power line 30 is suspended. y'" is the distance between the line and the ground and is unchanging despite varying ambient temperatures. As above, Dx is the distance between the towers and H is the height of the towers.

SUMMARY OF THE INVENTION

The present invention suspends a power line from a tower or the like using a reversed-scissor-like device having first and second arms that may be straight or arched or bent, and that are pivotally attached to each other. Each arm has a distal end and a proximal end. The distal end of each arm is longer than the proximal end of each arm. The distal end of each arm is attached to the power line being carried. The proximal ends of the arms are connected to each other by a coupling member or actuator rod. The actuator rod is thermally-affected such that its length intentionally increases as a function of ambient temperature. The arm geometry and coupling is such that as ambient temperature increases, the actuator rod length increases, which causes the distal ends of each reverse-scissor arm to approach each other. As the distance separating the distal ends is thus shortened, slack in the power line is taken in, and sag is reduced. In this fashion, thermal sag in the line is passively compensated.

One skilled in the art will see that the invention may take many different embodiments, some of which are set out below, depending on the arrangement of structural elements.

But each embodiment does the same thing, mitigates line sag, in essentially the same way, by mechanically amplifying the thermal expansion of a coupling member or actuator rod to pull in the slack in a suspended line.

The objects and advantages of the invention include, but are not limited to:

(i) provision of a means of mitigating power line sag which is considerably cheaper than current means;

(ii) provision of a means of mitigating power line sag which is automatic and self-adjusting such that the same change in ambient temperature that causes the line to sag will concomitantly cause the invention to act to mitigate the line sag;

(iii) provision of a means of mitigating power line sag which is automatic and self-adjusting such that the same change in line current (ampacity) that causes the line to sag will concomitantly cause the invention to act to mitigate the line sag;

(iv) provision of a means of mitigating power line sag without the necessity of retrofitting transmission towers to make them taller;

(v) provision of a means of mitigating power line sag which will allow transmission towers to be spaced at greater intervals than is presently necessary, thereby necessitating the erecting of fewer transmission towers;

(vi) provision of a means of mitigating power line sag which will allow the building of shorter transmission towers than is presently necessary;

(vii) provision of a means of mitigating power line sag without reducing line current (ampacity).

(viii) Provision of a means of mitigating power line sag which is inexpensive to manufacture and is essentially maintenance-free.

Other features and advantages of the invention will appear from the following description in which the preferred embodiments have been set forth in detail, in conjunction with the accompanying drawings.

DESCRIPTION OF THE INVENTION

Figure 1:
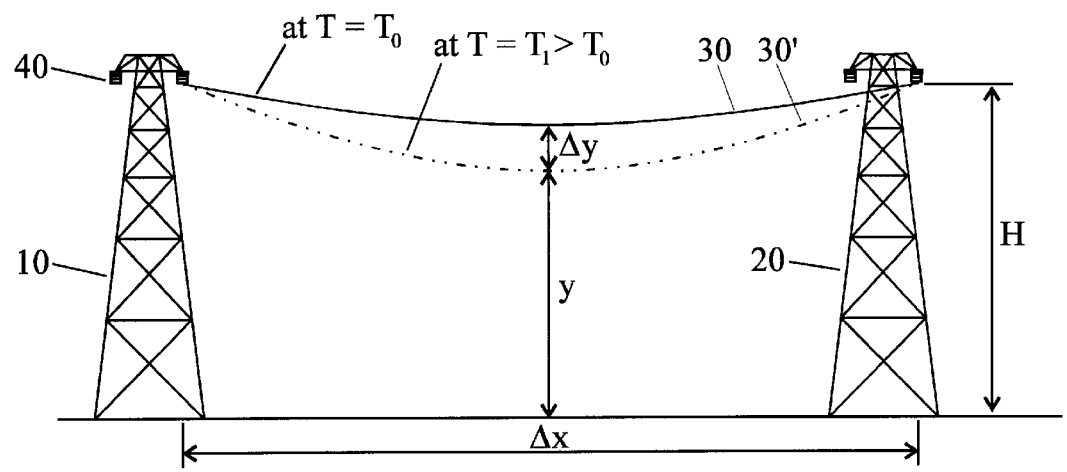
FIG. 1 depicts a generic power line transmission system according to the prior art showing the problem of line sag.
Figure 1A:
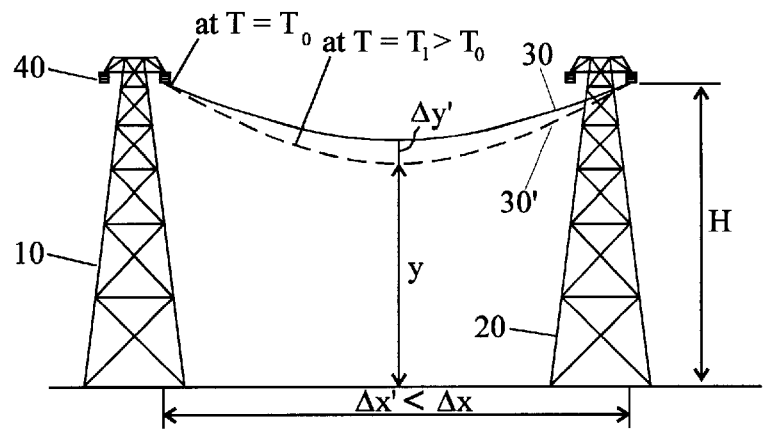
FIG. 1A depicts a generic power line transmission system according to the prior art wherein the problem of line sag has been mitigated by shortening the distance between adjacent towers to reduce span length and thus reduce line sag.
Figure 1B:
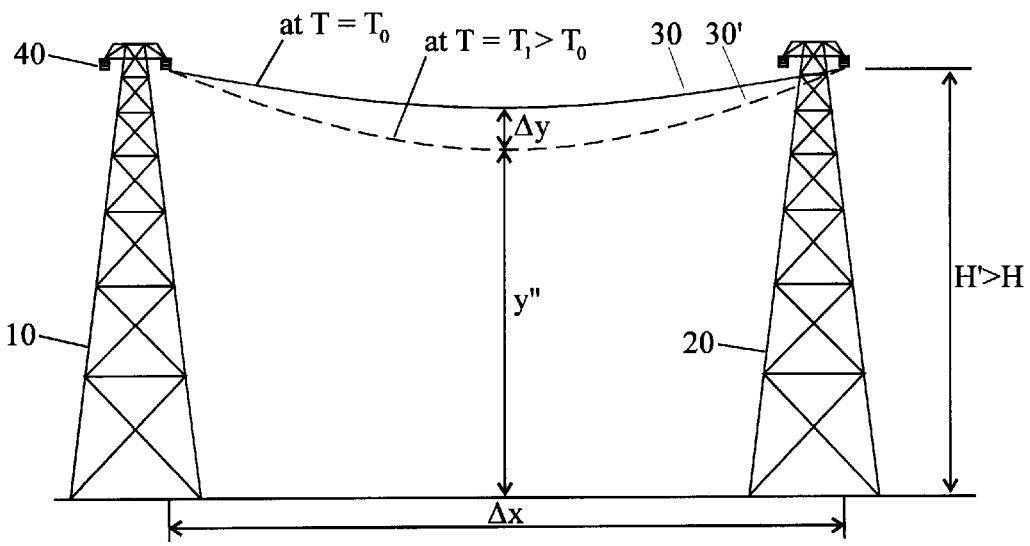
FIG. 1B depicts a power line transmission system according to the prior art wherein the problem of line sag has been mitigated by erecting taller transmission towers to accommodate line sag.
Figure 2:
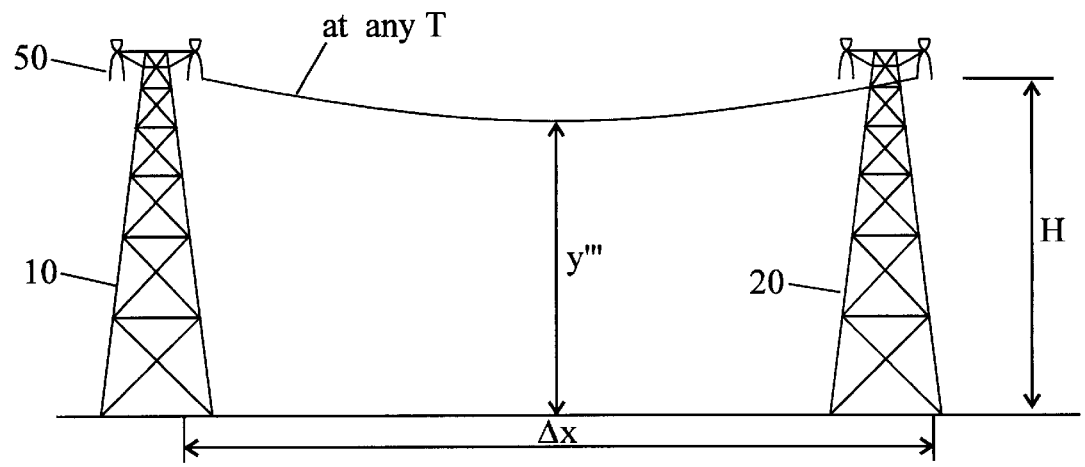
FIG. 2 depicts a generic power line transmission system in which the power line is suspended by an embodiment of the present invention, being a sag-compensating device.
Figure 3:
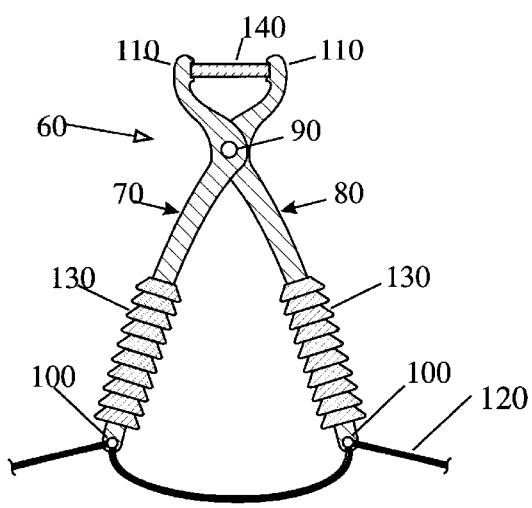
FIG. 3 shows a side view of the invention comprising a coupling member or actuator rod attached to a reverse-scissor device.

FIG. 3 shows a typical embodiment of the invention. A reverse-scissor device 60 is shown having first arms 70 and second arms 80 that may be straight or arched or bent, and that are pivotally attached to each other by a scissor hinge 90. The scissor hinge 90 may serve as the tower contact from which the sag mitigator is suspended. The scissor arms and the scissor hinge may be made of a metal or a metal alloy or ceramic or glass or glass or a carbon composite material or a glass fiber composite material or a strong plastic or wood or some other material with high strength and rigidity. Each arm has a proximal end 100 and a distal end 110. The distal portion of each arm (the distance from the hinge to the distal end of the arm) is longer than the proximal portion of each arm (the distance from the hinge to the proximal end of the arm). The distal end of each arm is attached to the power line 120 being carried and may be insulated by insulators 130 which may be made of an electrically insulating material such as fiberglass, ceramic or glass, rubber or plastic. The proximal ends of the arms are opposably connected to each other by an actuator rod 140. The actuator rod 140 is made of a material with a high coefficient of thermal expansion and a high compressive modulus of elasticity, such as a metal alloy such as a steel alloy or a composite material such as carbon fiber or glass fiber or an electrically non-conducting metal-filled plastic. The actuator rod is thermally-affected such that its length intentionally increases as a function of ambient temperature. The arm geometry and coupling is such that as ambient temperature increases, the actuator rod length increases, which causes the distal ends of each reverse-scissor arm to approach each other. As the distance separating the distal ends is thus shortened, slack in the power line is taken in, and sag is reduced. In this fashion, thermal sag in the line is passively compensated. The overall size of the device may be from a few inches, such as six inches to over fifteen feet, such as twenty feet in length depending on the voltage carried in the line and the amount of sag to be mitigated.

The invention operates automatically, responding to the same ambient temperature changes that cause the power line to sag. In the embodiment shown in FIG. 3, an increase in ambient temperature will cause thermal expansion in the coupling member or actuator rod 140 which will increase in length. The expansion of the actuator rod is proportional to the change in ambient temperature. The increase in length of the actuator rod 140 will force apart the proximal arms 110 of the reverse-scissor component 60. The reverse-scissor component is hinged such that the movement of the proximal arms 100 will be amplified in the longer, distal arms 110 of the reverse-scissor component. The distal arms of the reverse-scissor component will thus be forced together. The movement of the distal arms of the reverse-scissor component will draw in the attached power line 120, taking up the slack in the line.

Figure 4:
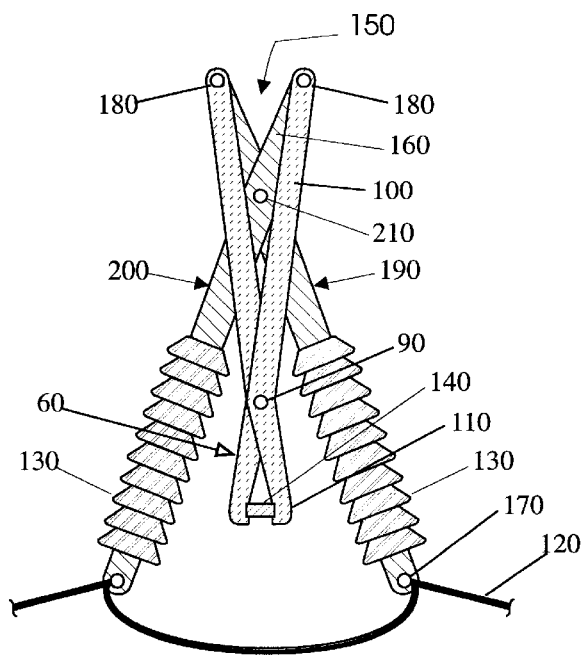
FIG. 4 shows a side view of an alternate embodiment of the invention comprising a coupling member or actuator rod attached to a reverse-scissor device, said reverse-scissor device being coupled to a normal-action scissor device.

FIG. 4 shows an alternate embodiment of the invention which uses a normal-action scissor device 150 connected to a reverse-scissor device 60. In this embodiment, the proximal ends of the reverse-scissor arms 110 are opposably connected to each other by a coupling member or actuator rod 140 as described above. The distal reverse-scissor arms 100 are attached to the proximal ends of the normal-action scissor arms 160 by hinges 180. The normal-action scissor device has first arms 190 and second arms 200 that may be straight or arched or bent, and that are pivotally attached to each other by a scissor hinge 220. The scissor hinge 220 may serve as the tower contact from which the sag mitigator is suspended. The normal-action scissor arms and the normal-action scissor hinge may be made from a material as listed for the reverse-scissor arms. The distal ends of the normal-action scissor arms contact the power line to be carried and may be insulated by insulators 130 which may be made of an electrically non-conducting material such as fiberglass, ceramic or glass, rubber or plastic.

In this embodiment, shown in FIG. 4, as ambient temperature increases, the actuator rod 140 length increases. The increase in length of the actuator rod 140 will force apart the proximal arms 110 of the reverse-scissor component 60. The reverse-scissor component is hinged such that the movement of the proximal arms will be amplified in the longer, distal arms 100. The distal arms of the reverse-scissor component will thus be forced apart. The end of each distal arm of the reverse-scissor component is attached to the proximal arm 160 of a normal-action scissor component 150. The movement of the distal arm of the reverse-scissor component 100 transfers force to the proximal arms 160 of the normal-action scissor component 150, forcing the proximal arms together. The normal-action scissor component is hinged by a hinge 210 such that the movement of the proximal arms 160 will be amplified in the longer, distal arms 170. The distal arms of the normal-action scissor component will thus be forced together. The movement of the distal arms of the normal-action scissor component will draw in the attached power line 120, thus taking up the slack in the line.

An alternate embodiment of the embodiment described in FIG. 4 may use any number of normal-action scissor and reverse-scissor devices, linked together, as described above, in such a way as to amplify the axial expansion of the actuator rod so as to draw in the slack in the line.

Figure 5:
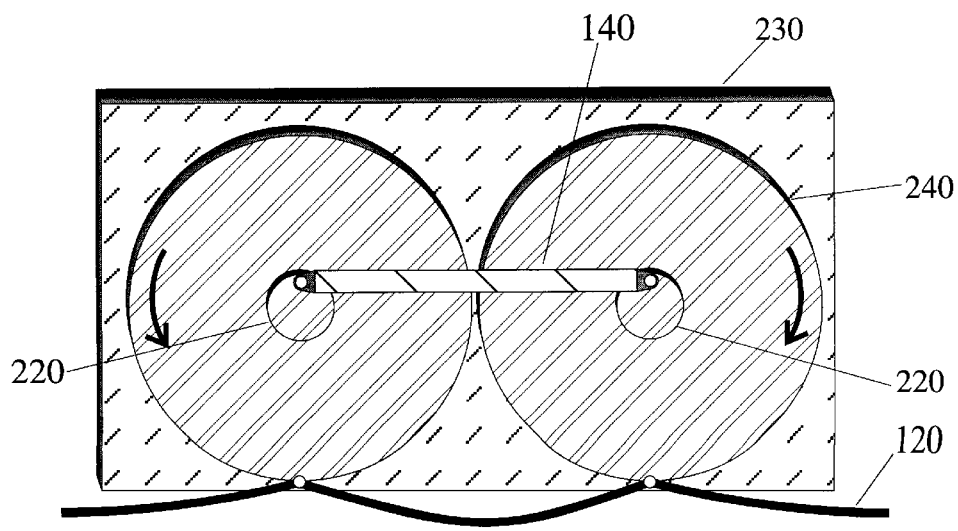
FIG. 5 shows an alternate embodiment of the invention comprising a coupling member or actuator rod attached to a series of disks.

FIG. 5 shows an alternate embodiment. This alternate embodiment relies on the same principal of thermal expansion and amplification of movement as the above embodiments, but uses rotating disks to transmit and amplify the movement of the coupling member or actuator rod so as to draw in the slack of the power line. In this embodiment each end of the coupling member or actuator rod 140 is connected at or close to the circumference of one of a pair of first disks 220. Each first disk may be made of a metal or a metal alloy or ceramic or glass or a carbon composite material or a glass fiber composite material or a strong plastic or wood or some other material with high strength and rigidity. Each first disk is mounted at its central axis to an immovable support 230, such as flat metal or ceramic or glass plate attached to the transmission tower, said mounting allowing rotational freedom of movement of the disk. The actuator rod 140 is connected to the disks in such a way that when the rod increases in length (due to thermal expansion) it produces a force upon the first disks 220, forcing the first disks to rotate, each in a different direction. Each first disk 220, is attached centrally on the side of each second disk 240, also made of a material as listed for the first disk, such that each first disk lies flat against each second disk, each pair of attached disks having the same axis of rotation, but with the second disk 240 having a greater diameter than the first disk 220. The power line 120 contacts each second disk at or near its rim. The configuration of the actuator rod and the disks is such that expansion of the actuator rod will cause the disks to rotate through about 90°, causing each point of attachment to move upward in an arc, towards the other, tightening the power line and reducing the slack.

An alternate embodiment of the invention comprises a variation of the above embodiment but uses a series of interlocking toothed disks as gears to amplify the movement of the actuator rod. The number of disks or gears may be increased to increase amplification of the movement of the actuator rod caused by thermal expansion.

Figure 6:
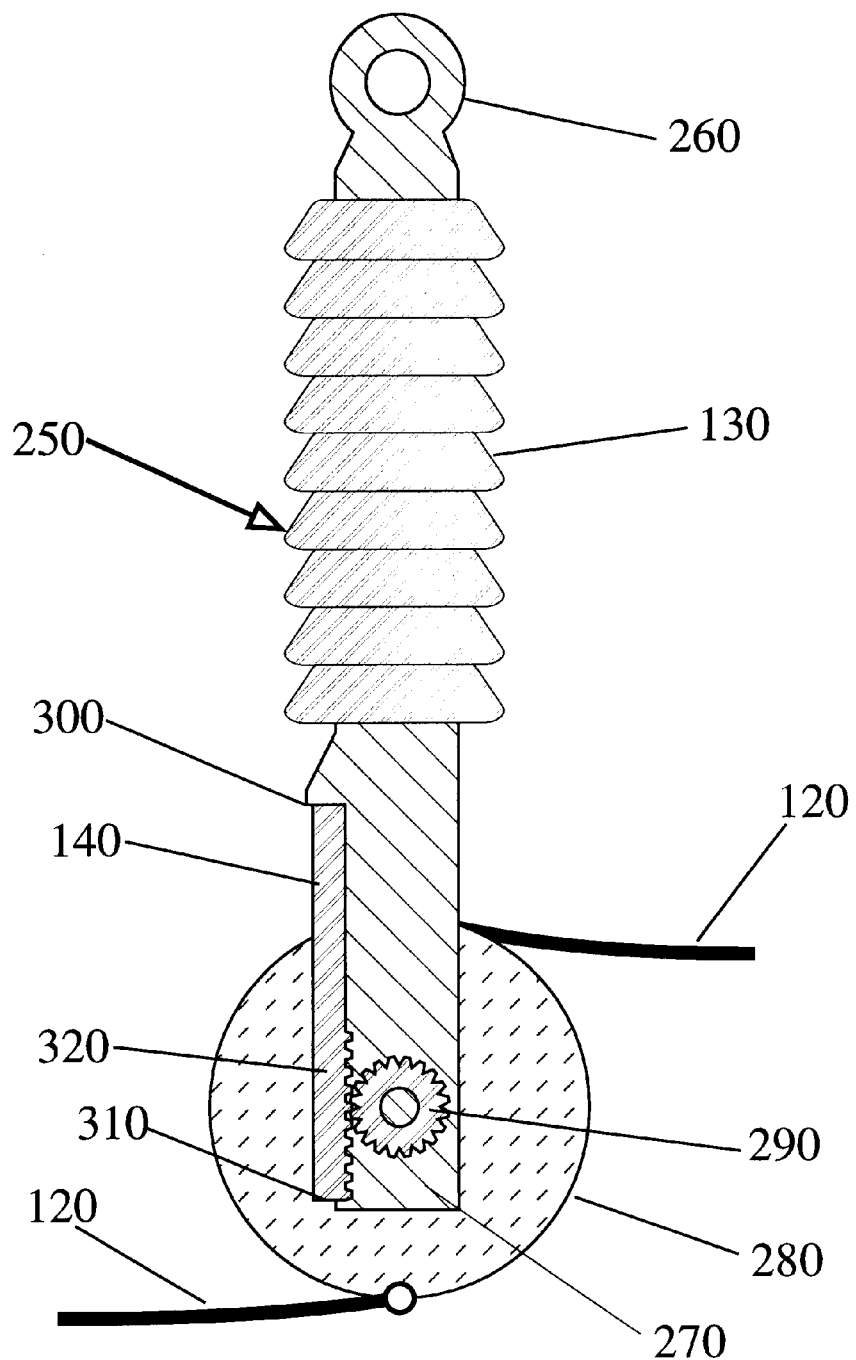
FIG. 6 shows an alternate embodiment of the invention comprising a coupling member or actuator rod mounted parallel to an insulator, the actuator rod being coupled to a rotatable disk via a toothed cog coupling that transfers the axial extension of the actuator rod to the disk.

FIG. 6 shows an alternate embodiment comprising a suspension member 250 which is insulated by insulators 130, made of an electrically non-conducting material such as fiberglass, ceramic or glass, rubber or plastic. The suspension member 250 has a first end 260 and a second end 270, said first end 260 contacts some part of the transmission tower (not shown). A disk 280 is mounted upon the second end of the suspension member 270 such that the flat surface of the disk is parallel with the long axis of the suspension member and such that the mounting is at center of the disk, allowing rotational movement of the disk 280. A power line 120 to be carried is attached at two places on the rim of the disk. The disk 280 may be made of a metal or a metal alloy or ceramic or glass or a carbon composite material or a glass fiber composite material or a strong plastic or wood or some other material with high strength and rigidity. A toothed cog 290 is securely mounted against the disk 280 at the center of the disk such that when the cog turns so does the disk. An actuator rod 140 having a first end 300 and a second end 310, is attached parallel and along side the suspension member 250 such that the first end of the actuator rod 300 is immovably attached to some part of the suspension member, perhaps half way along the length of the suspension member. The second end of the actuator rod 310 is free to elongate by thermal expansion and has a toothed edge 320 that interlocks with the cog 290. As the actuator rod increases in length it causes the cog to rotate which in turn causes the disk to rotate thereby tightening the power line and reducing the slack. The overall size of the embodiment, from the first end of the suspension member to the bottom of the disk, may be from a few inches, such as six inches to over fifteen feet, such as twenty feet in length.

In this embodiment, as shown in FIG. 6, thermal expansion of the actuator rod 140 will force the cog 290 to rotate. Rotation of the cog will cause the concomitant rotation of the disk 280 such that the power line 120 will be drawn up, reducing slack in the line.

An alternate embodiment of the embodiment described in FIG. 6 uses a skewed gear mechanism or a series of hinged connections, rather than a toothed actuator rod and toothed cog, to facilitate transfer of force from the actuator rod to the disk.

Figure 7A:
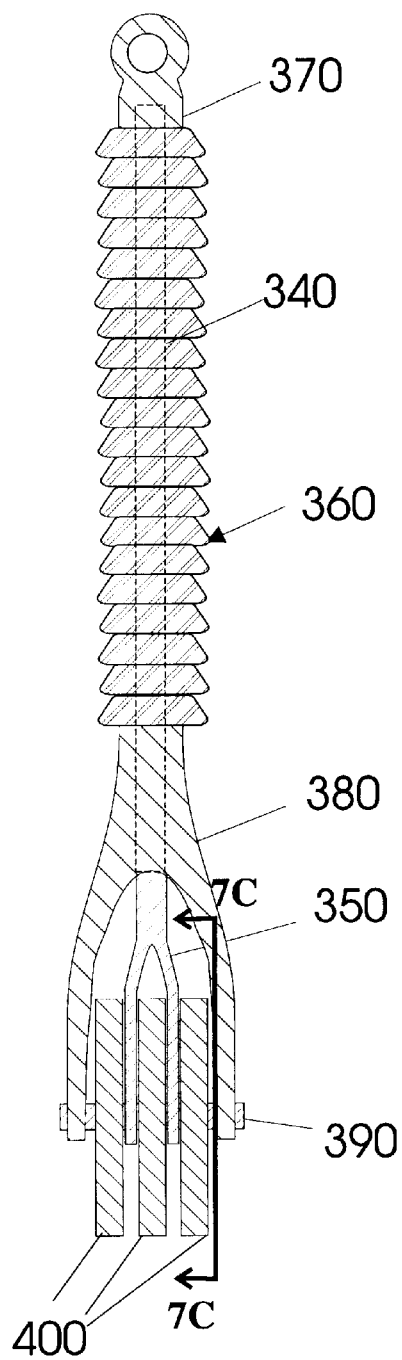
FIG. 7A shows an alternate embodiment of the invention comprising an actuator rod mounted within the hollow core of an insulator, connected acentriacally to a shaft such that expansion of the actuator rod will cause rotation of the shaft.
Figure 7B:
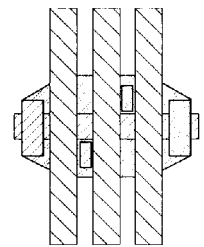
FIG. 7B is a view from the bottom of FIG 7A.
Figure 7C:
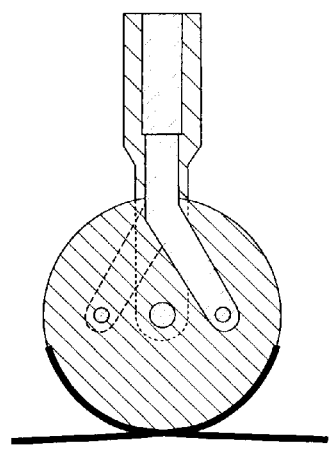
FIG. 7C is a view along section 7C—7C of FIG. 7A.

FIGS. 7A–C shows an alternate embodiment whereby an actuator rod 330, having a first end 340 and a second end 350 is centrally located within the hollow core of a hollow insulator 360, said insulator having a first end 370 and a second end 380, said first end 370 being attached to some part of a transmission tower (not shown) and said second end 380 being forked. The first end of the actuator rod 340 is immovably attached within the hollow core of the first end of the insulator 370. The second end of the actuator rod 350 attaches eccentrically to a rotatable shaft 390, said rotatable shaft being mounted in a plane perpendicular to the length of the actuator rod, and being rotatably mounted between the two forks of said second end of said insulator 380 such that an increase in length of the actuator rod 350 will exert an eccentric force on the rotatable shaft 390 causing the shaft to rotate. One or more disks 400 are immovably attached to the shaft such that the such that the shaft forms an axle which when rotated, causes the disks to rotate. A power line 120 to be carried is attached to the disks 400 such that when the disks rotate, the power line is drawn up and the slack in the line is reduced.

In this embodiment, as shown in FIGS. 7A, thermal expansion of the actuator rod 350 exerts an eccentric force upon the shaft 390, which is rotatably mounted between the forks of the second end of the insulator 380. As the shaft rotates, it causes the concomitant rotation of one or more disks 400. The power line is attached at or near the circumference of these disks such that when they are caused to rotate, the power line is drawn up and slack is reduced.

Figures 8A, 8B, 8C:
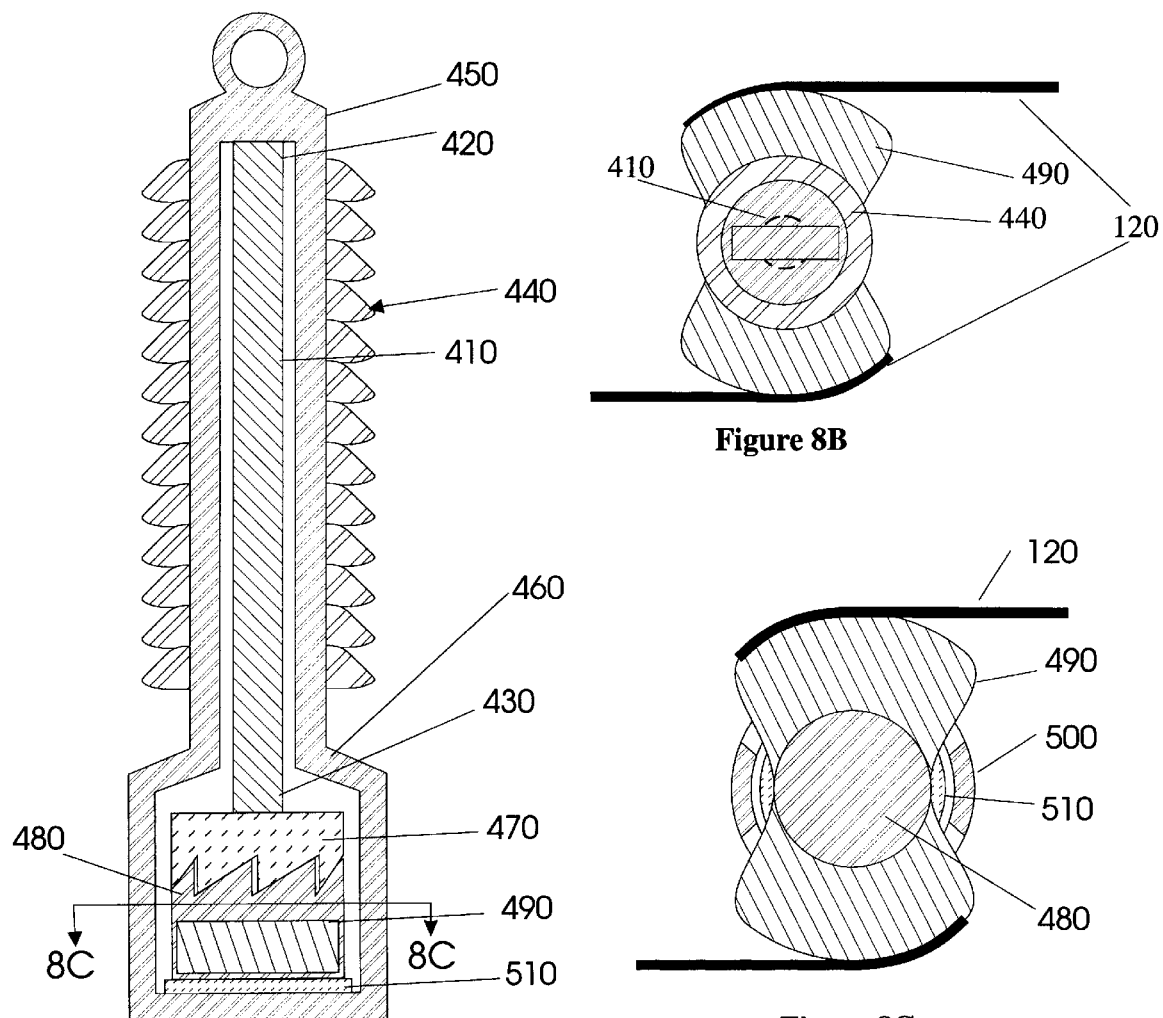
FIG. 8A shows an alternate embodiment of the invention comprising an actuator rod mounted within the hollow core of an insulator, said rod being connected to a plate or disk via a linkage system or a skewed gear system such that the axial expansion of the actuator rod is amplified and is translated through 90° to the connected disk to cause rotation.
FIG. 8B is a view from the top of FIG. 8A.
FIG. 8C is a view along section 8C—8C of FIG. 8A.

FIGS. 8A–C show an alternate embodiment whereby an actuator rod 410, having a first end 420 and a second end 430 is centrally located within the hollow core of a hollow insulator 440, said insulator having a first end 450 and a second end 460, said first end 450 being attached to some part of a transmission tower (not shown). Said first end of said actuator rod having immovably attached at its end a first skewed toothed cog 470. Said first skewed toothed cog 470 cooperating with a complementary second toothed cog 480. Said second skewed toothed cog is immovably attached to a rotating plate 490. Said rotating plate is held in place by the bottom section 500 of said second end of said insulator 460. A Bearing plate 510 lies between said rotating plate 490 and said bottom section 500 of said second end of said insulator. Said rotating plate 490 attaches to a power line to be carried 120. In this embodiment, as the actuator rod increases in length due to thermal expansion, the first 470 and second 480 skewed toothed cogs communicate such that the second skewed toothed cog is forced to rotate, thereby causing the rotating plate to concomitantly rotate, thereby drawing in the power line and reducing slack in the line.

Figure 9:
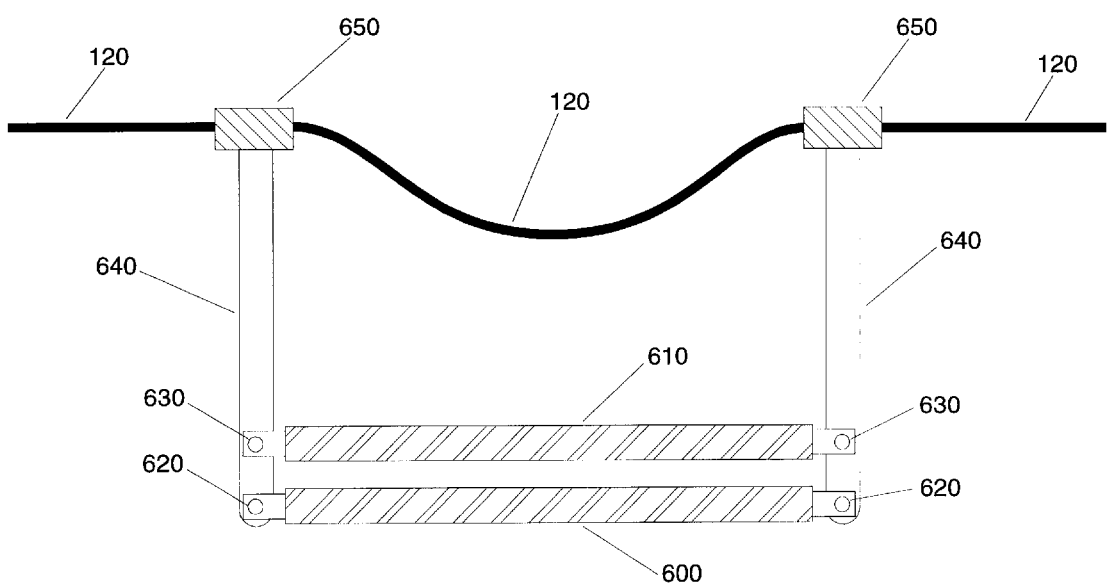
FIG. 9 shows an alternate "scissor" embodiment of the invention comprising an actuator rod hinged at either end to one of the opposing scissor arms. A fulcrum rod is provided parallel to the actuator rod and relatively close to the actuator rod in comparison to the length of the scissor arms, and is hinged at either end to one of the opposing scissor arms. The invention is attached at attachment points at the ends of the scissor arms to the power line.

FIG. 9 shows an alternate "scissor" embodiment of the invention comprising an actuator rod (also called a coupling member) 600 hinged at either end by actuator rod hinges 620 to one of the opposing scissor arms 640. A fulcrum rod 610 is provided approximately parallel to the actuator rod, and is hinged at either end to one of the opposing scissor arms by fulcrum rod hinges 630. The fulcrum rod is relatively close to the actuator rod in comparison to the total length of the scissor arms and is generally hinged to the scissor arms at least about three quarters to ninety-nine hundredths of the way down the scissor arm. The invention is attached to the power line 120 or to the tower structure at attachment points 650 present at the ends of the scissor arms. Attachment points connect the scissor arms to the power line in between two tower structures or on both sides of the same tower structure (i.e.: one attachment point attached to the power line on one side of the tower and the other attachment attached to the power line on the other side of the same tower). The invention is supported at its attachment points to the power line or from the supporting tower or both. Alternatively, one of the attachment points may be attached to the frame of the supporting tower. In this embodiment, it is preferable that the line between the attachment points has some slack to allow movement of the scissor arms. The attachment points at the ends of the scissor arms grasp the power line firmly.

The attachment points comprise a means for attaching a line, such as a clamp or vice or clip or hook or V-shaped wedge attached to the end of the scissor arm that securely grips that power line. The power line itself may even be tied in a knot so as to secure it to the attachment point. Means of attachment of a wire to an object are well known in the art. The attachment point will preferably be made from an insulating material. Alternatively, the attachment points may comprise a means for attachment, not to a power line, but to a stationary object such as a tower. Such a means for attachment may be a clip or hook-and-eye or a tied or knotted wire or a weld or a bolt or rivet or adhesive or a screw or any other suitable means of attachment. The fulcrum arm is an important part of this embodiment and has a very low modulus of thermal expansion (it may even be negative) and a high tensile modulus and strength. The fulcrum arm may, for instance, be made of metals such as carbon steel or Molybdenum, plastics, composites such as fiber glass or carbon fiber composites, or organic materials such as wood. The scissor arms may be either straight or curved. The actuator is the same as for other embodiments, having high thermal expansion, high compressive modulus and high strength.

It is also evident that the invention can be connected to more than a single power line through its attachment points. That is the invention can be connected to parallel and close power lines and function similarly.

Figure 10:
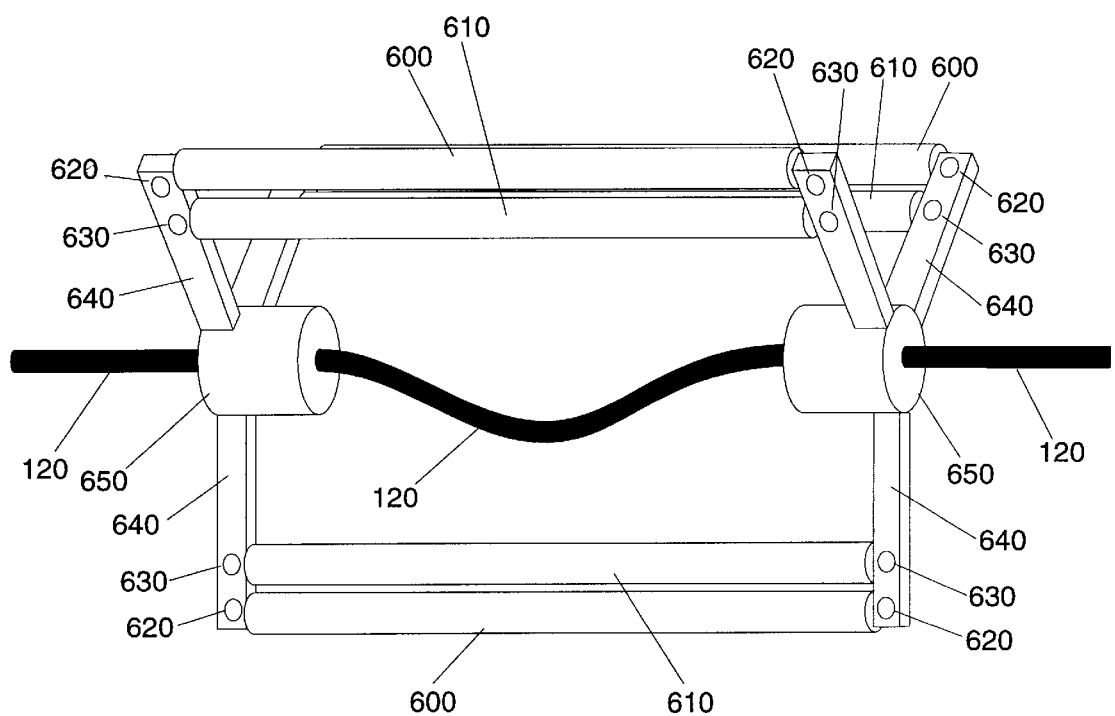
FIG. 10 shows a variation on the embodiment of FIG. 9 wherein the multiple units of the assembly of FIG. 9 are attached to the same stretch of power line to increase the tension on the line. These units are arranged radially about the line, but could equally be arranged non-radially, such as hanging side by side.

FIG. 10 shows a variation on the embodiment of FIG. 9 wherein multiple units of the assembly of FIG. 9 are attached to the same length of power line to increase the tension on the line. These units may be arranged radially about the line, but could equally be arranged non-radially, such as hanging side by side.

Figure 11:
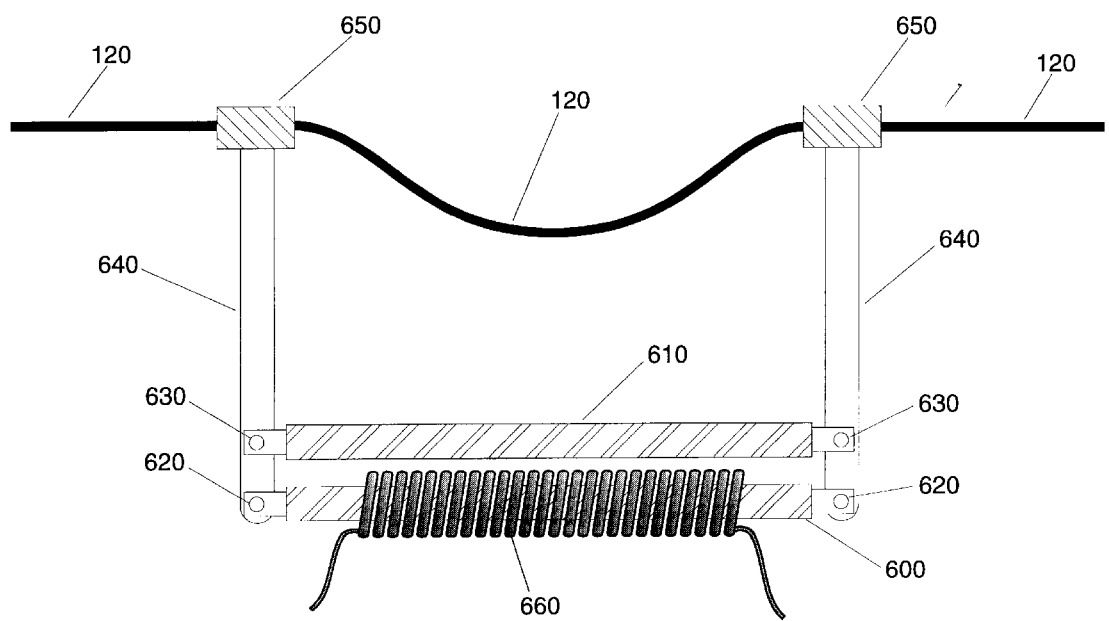
FIG. 11 shows a variation on the embodiment of FIG. 9 wherein the actuator is electrically heated.

FIG. 11 shows an alternate embodiment of FIG. 9 wherein the actuator rod is thermally heated by a heating coil 660 to allow intentional tensioning of a line. The heating coil responds proportionally to the current in the power line to raise the temperature of the actuator as current in the power line is increased.

An alternate embodiment differs from the aforementioned embodiments only in that the actuator rod is replaced with a hydraulic or pneumatic piston-tube that comprises a fluid-filled vessel, such as a tube, one end of which is closed and the other end of which accommodates a piston, slidably mounted in the vessel such that an expansion of the fluid (such as a hydrocarbon liquid such as diesel fuel, or a gas such as Nitrogen) within the vessel will cause the piston to move outward. In this manner, the hydraulic or pneumatic piston-tube will respond to an increase in ambient temperature in the same way as the actuator rod, exerting force on members so as to ultimately cause the slack in a power line to be reduced.

An alternate embodiment differs from the aforementioned embodiments only in that the coupling member or actuator rod or piston-tube is clad in a heating jacket. The heating jacket may comprise an insulated electric heating element, with current being supplied from the power line. The heating element will be heated in proportion to the current being carried in the line. This heating effect will cause the actuator rod or piston-tube to expand, reducing slack in the line and so counteracting the sag effects due to heating of the power line due to increased current flow in the power line.

An alternate embodiment differs from the aforementioned embodiments in that the arms or disks carrying the power line are caused to move by the action of a powered motor, such as an electric motor, thereby reducing line sag.

Summary, Ramifications and Scope

Accordingly, it will be apparent that the invention will automatically counteract the effects of line sag caused by thermal expansion of the line and will allow the building of fewer, shorter towers and will reduce the cost of retrofitting existing towers and will allow the transmission of higher currents during times of peak electricity demand.

The invention provides a means of mitigating power line sag which is considerably cheaper than current means; it provides a means of mitigating power line sag which is automatic and self-adjusting such that the same change in ambient temperature that causes the line to sag will concomitantly cause the invention to act to mitigate the line sag; it provides a means of mitigating power line sag which is automatic and self-adjusting such that the same change in line current (load) that causes the line to sag will concomitantly cause the invention to act to mitigate the line sag; it provides a means of mitigating power line sag without the necessity of retrofitting transmission towers to make them taller; it provides a means of mitigating power line sag which will allow transmission towers to be spaced at greater intervals than is presently necessary, thereby necessitating the erecting of fewer transmission towers; it provides a means of mitigating power line sag which will allow the building of shorter transmission towers than is presently necessary; it also provides a means of mitigating power line sag without reducing line current (load).

Additionally, the invention is a relatively simple mechanical device, reducing the cost of manufacture and also reducing the probable need for maintenance. The invention is equally applicable to any suspended line, not just to a line carrying electric power.

The specificities in the above description should not be construed to limit the scope of the invention, but rather as examples of possible preferred embodiments. The sizes of the components may vary depending on the size of the tower to which the invention is fitted and the size of the voltage being carried in the power line. The materials used to construct the components may be as suggested above or may be any other materials with suitable mechanical and electrical properties. In the embodiments that involve scissor components, the arrangement and number of scissor components may be varied to change amplification of movement or to decrease stress on the individual components. In the embodiment using a gear or disk system, the arrangement or number of gears may likewise be varied. The actuator rod may be made of a number of substances which expand in response to increasing temperature such as metal alloys but may be made from other substances such as composite materials such as carbon fiber, glass fiber, or an electrically non-conducting metal-filled plastic and the like.

Thus, since numerous modifications and alternate embodiments will readily occur to those skilled in the art, the scope of the invention should not be limited by the afore-mentioned illustrative embodiments, but should be determined by the appended claims and their equivalents.

I claim:

1. For use with a suspended line, a sag-compensating device comprising:

first and second reverse-scissor arms pivotally joined to each other, each of said arms having a distal end retaining said line, and having a proximal end, and;

a coupling member opposedly connected between each proximal end of said reverse-scissor arms, said coupling member having a length that changes as a function of temperature;

said reverse-scissor arms and said coupling member cooperating together such that as temperature increases, said distal ends of said reverse-scissor arms approach each other;

wherein sag in said line is reduced as ambient temperature is increased.

2. The sag-compensating device of claim 1, wherein at least one of said arms is bent.

3. The sag-compensating device of claim 1, wherein said coupling member has a thermal co-efficient ranging from about $1 \times 10^{-6}$ inch/inch/° F. to about $1 \times 10^{-3}$ inch/inch/° F.

4. The sag-compensating device of claim 1, wherein said reverse-scissor arms are arranged such that said change in length of said coupling member is amplified by action of said reverse-scissor arms.

5. The sag-compensating device of claim 1, wherein said coupling member is electrically heated.

6. The sag-compensating device of claim 1, wherein said distal ends of said reverse-scissor arms are caused to approach each other by the action of a powered motor.

7. For use with a suspended line, a sag-compensating device comprising:

first and second normal-action-scissor arms pivotally joined to each other, each of said arms having a distal end retaining said line, and having a proximal end; and a reverse-scissor device having first and second reverse-scissor arms pivotally joined to each other, each of said reverse-scissor arms having a distal end pivotally attached to said proximal end of said normal-action-scissor arms, and having a proximal end; and a coupling member opposedly connected between each proximal end of said reverse-scissor arms, said coupling member having a length that changes as a function of temperature;

said arms and said coupling member cooperating together such that as temperature increases, said distal ends of said normal-action-scissor arms approach each other;

wherein sag in said line is reduced as ambient temperature is increased.

8. The sag-compensating device of claim 7, wherein at least one of said arms is bent.

9. The sag-compensating device of claim 7, wherein said normal-action-scissor arms and said reverse-scissor arms are arranged such that said change in length of said coupling member is amplified by action of said reverse-scissor and said normal-action-scissor arms.

10. The sag-compensating device of claim 7, wherein said coupling member has a thermal co-efficient of expansion ranging from about $1 \times 10^{-6}$ inch/inch/° F. to about $1 \times 10{-3}$ inch/inch/° F.

11. The sag-compensating device of claim 7, wherein said coupling member is electrically heated.

12. The sag-compensating device of claim 7, wherein said distal ends of said normal-action-scissor arms are caused to approach each other by the action of a powered motor.

13. For use with a suspended line, a sag-compensating device comprising:

an actuator that changes as a function of temperature, said actuator having a first and a second end, a first and a second scissor arm each having a proximal and a distal end, a fulcrum arm having a first and a second end, said actuator being pivotally connected at each end by an actuator rod hinge to the first and second scissor arms, respectively, said connection being towards the proximal end of the scissor arm, said fulcrum arm being pivotally connected at each end by a fulcrum rod hinge to the first and second scissor arms, respectively, said connection being towards the proximal end of the scissor arm, and being between the actuator and the distal end of the scissor arm, each of said scissor arms having at its distal end, a means for attachment to an object, said means for attachment to an object being attached to said object, said object being selected from the group consisting of a power line and a tower, wherein sag in said line is reduced as ambient temperature is increased.

14. The invention of claim 13 wherein the scissor arms are bent.

15. The invention of claim 14 wherein a plurality of such sag-compensating devices are attached to a line.

16. The invention of claim 15 wherein said plurality of sag-compensating devices are attached to a line in a radial fashion.

17. The invention of claim 13 wherein the actuator device is electrically heated.

* * * * *